United States Patent [19]

Gowetski et al.

[11] 4,234,633
[45] Nov. 18, 1980

[54] REINFORCED STUD SUPPORTS IN FIBERGLASS PARTS

[75] Inventors: Michael Gowetski, Muncie; Robert W. Smith, Marion, both of Ind.

[73] Assignee: The General Tire & Rubber Co., Akron, Ohio

[21] Appl. No.: 32,048

[22] Filed: Apr. 23, 1979

Related U.S. Application Data

[60] Continuation of Ser. No. 850,758, Nov. 11, 1977, abandoned, which is a division of Ser. No. 713,757, Aug. 12, 1976, Pat. No. 4,088,525.

[51] Int. Cl.³ .......................... B32B 3/26; B32B 3/30
[52] U.S. Cl. ..................................... 428/36; 264/241; 264/257; 428/172; 428/332

[58] Field of Search ................... 428/35, 36, 172, 139, 428/188, 332; 264/137, 250, 257, 271, 275, 241; 156/173; 52/577, 309.2; 296/193, 35 R

[56] References Cited

U.S. PATENT DOCUMENTS

2,710,526  6/1955  Stewart et al. ....................... 264/137

Primary Examiner—Paul J. Thibodeau

[57] ABSTRACT

In the manufacture of a fiberglass reinforced plastic part a chopped glass fiber reinforced, thermosetting resin is placed in a mold cavity. A continuous filament fiberglass cylinder impregnated with the same resin used in the above formulation without chopped fiberglass is placed in the stud support areas of the mold. The mold is then closed and the resin subjected to heat and pressure to cause it to completely fill the mold cavity and cure. The cured part has woven fiberglass reinforcements in the stud support areas.

1 Claim, 6 Drawing Figures

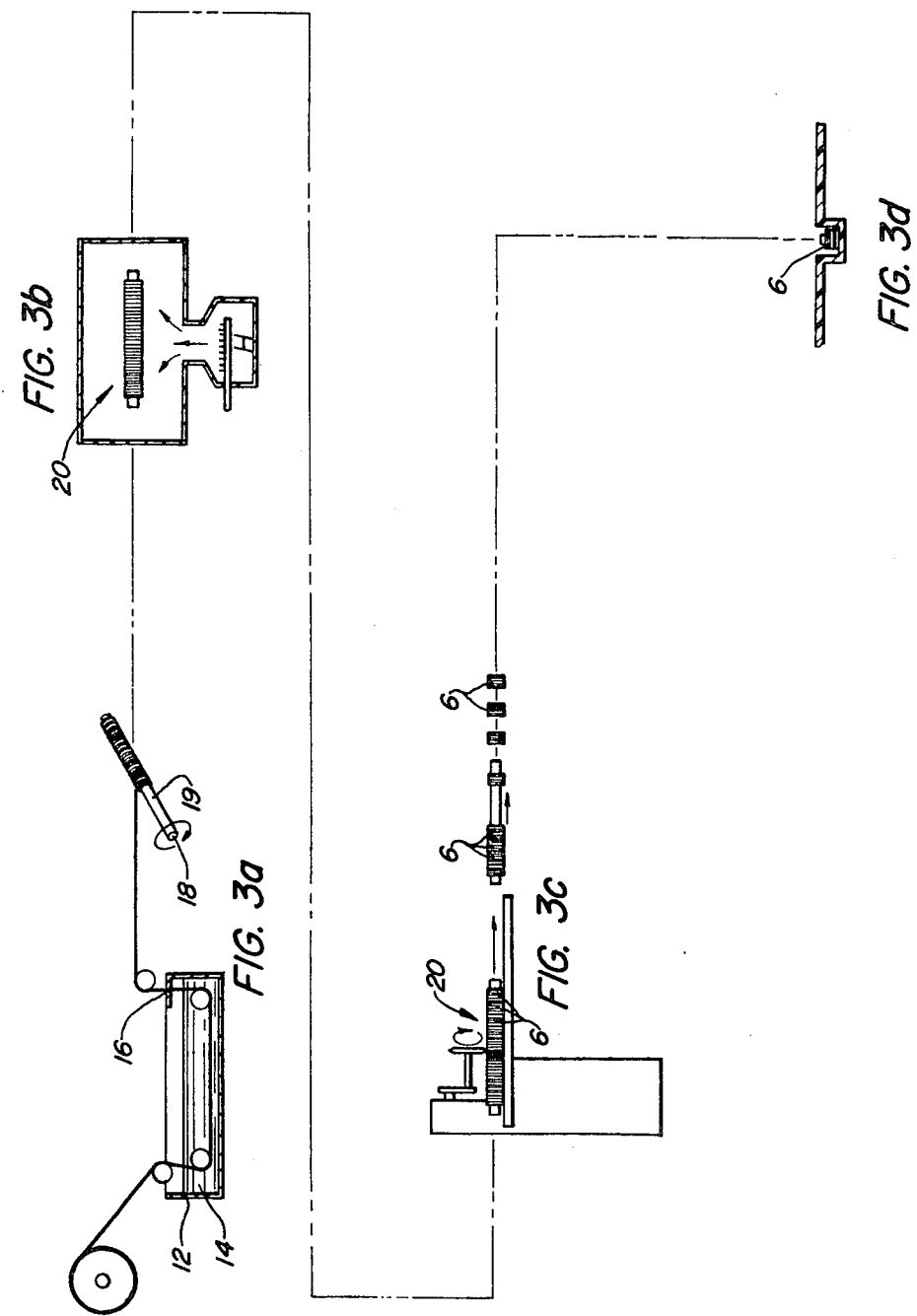

REINFORCED STUD SUPPORTS IN FIBERGLASS PARTS

This is a continuation, of application Ser. No. 850,758 filed Nov. 11, 1977, now abandoned, which in turn is a division of Ser. No. 713,757 filed Aug. 12, 1976 (now U.S. Pat. No. 4,088,525 Issued May 9, 1978).

BACKGROUND OF THE INVENTION

1. Field of the Invention

This invention relates to a molded chopped fiberglass reinforced plastic parts having fiberglass cylindrical continuous filament reinforcement in the stud support areas, and a method of making same.

2. Description of the Prior Art

Molded chopped fiberglass reinforced plastic parts are usually made by placing a chopped fiberglass containing, thermoplastic, thermosetting resin (sheet molding compound or SMC) in a mold cavity and then with heat and pressure causing the resin to fill the cavity and cure. When such parts had stud supports it was often difficult to insert the studs in the stud support openings without breaking the stud support. It was also difficult to retain the studs in the openings. In addition, sometimes the openings would not completely fill. This has resulted in considerable difficulty in the manufacture of grill panel openings for automobiles.

Using the prior art procedure, difficulties were encountered with the stud supports in as high or higher than 50% of the grill panel openings produced in some runs. In addition, the automobile manufacturers had difficulties with the grill panel openings upon assembly of automobiles. The studs would come loose from the stud supports during travel of the automobile down the assembly line and seriously interferred with the normal mass productive system.

SUMMARY OF THE INVENTION

It has been discovered that by inserting continuous filament fiberglass cylinders impregnated with the same thermosetting resin used in making the part, into the stud support areas of the mold prior to molding of the plastic part that the problem of stud support failure was eliminated. Other methods of attempting to solve the problem such as inserting thermosetting resin having higher than normal loading of chopped glass fibers and the insertion of thermosetting resin impregnated chopped fiberglass matting ino the stud support openings failed to solve the problem.

BRIEF DESCRIPTION OF THE DRAWINGS

FIGS. 3a, b, c and d are schematic drawings of a method for making resin impregnated glass fiber cylinders and inserting them into a mold.

DESCRIPTION OF THE PREFERRED EMBODIMENTS

Figure 1:
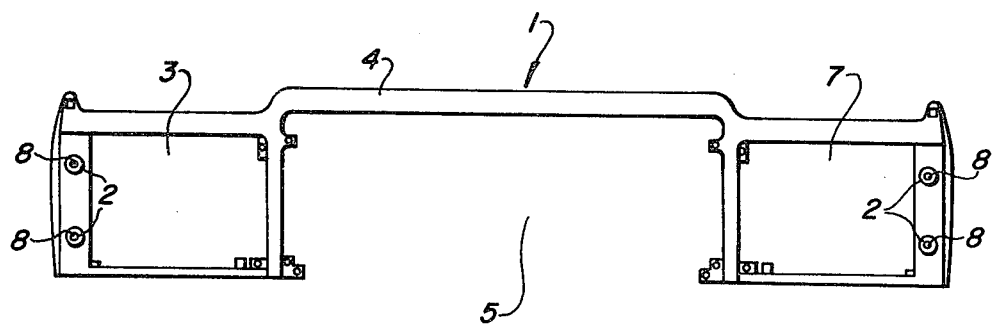
FIG. 1 is a rear view of a grill opening panel having a number of circular stud supports.
Figure 2:
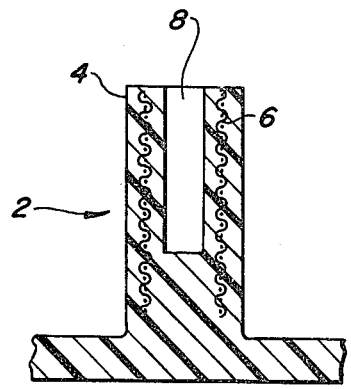
FIG. 2 is a cross-sectional view of one of the stud supports showing embedded fiberglass.

Turning now more particularly to FIG. II a cross-sectional view of stud support 2 is shown. The stud support is composed of a chopped fiberglass filled resin 4. Embedded in this resin is a continuous filament fiberglass cylinder 6. The stud support opening is shown at 8. The body of the grill panel opening 1 is also composed of fiberglass filled resin. Stud supports on the grill panel opening are shown at 2 and the panel openings at 3, 5 and 7. The fiberglass part having reinforced stud supports is made by the following procedure.

Thermosetting resin impregnated continuous filament fiberglass cylinders are positioned in the openings of the mold which form the stud supports. The cylinders were manufactured by passing glass strands through a container of the resin used to make the SMC (with holes just large enough for the glass) and then winding it on a 9.4 rod 9.4 millimeters in diameter and 610 millimeters long wrapped with polyethylene. The rod was then heated for one hour at about 85° C. The cylinder reached the 'B' state of maturation.

The long cylinder was then cut to 25 millimeter length cylinders and removed from the rod.

The cylinders have a length of 25 millimeters, an outer diameter of 12 millimeters and an inner diameter of 9.4 millimeters. Chopped fiberglass filled thermoplastic thermosetting resin (SMC) is placed in appropriate areas of the mold cavity in a sufficient amount to fill the cavity when the mold is closed. The mold is closed and heated and the pressure causes the chopped fiberglass filled resin to fill the mold cavity including the spaces around the resin impregnated woven fiberglass cylinders. The resin is cured in the mold cavity to form the desired part having reinforced stud supports and then removed. The results were that there were no cracks on any of the stud supports. Ten parts were checked to torque and they all passed the 8.46 Newton meter torque test. The test involved inserting self-threading studs into the supports and torquing them to 8.46 Newton meters.

Equivalent results were obtained using a woven fiberglass cylinder impregnated with the same resin used in the manufacture of the SMC. By the same resin is meant all of the ingredients which go into the SMC except the chopped fiberglass.

By continuous filament fiberglass is meant that the filaments are of sufficient lengths and positioned such a way as to completely encircle the opening in the stud support. In other words, each filament has a length greater than the diameter of the cylinder, and encircles the cylinder at least once.

The preferred (SMC) is a mixture of an unsaturated polyester dissolved in styrene. The resin contains a peroxide, lubricant, fiberglass, curing agent and fller. The fiberglass constitutes 15 to 60% of the mix by weight preferably 22 to 35%. The fiberglass is 12 to 50 millimeters long and has a very small diameter. The polyester plus styrene usually constitutes about 15% by weight of the mix. The lubricant, e.g., zinc stearate and the peroxide are present in small amounts. A small amount of a thickener such as magnesium oxide is also present. Impact modifiers such as butadiene-styrene block copolymers are optional ingredients. Details of the materials used in making sheet molding compounds form no part of the present invention and are disclosed in SPI Handbook of Technical and Engineering of Reinforced Plastics/Composites by J. Gilbert Mohr, et al, Second Edition, Copyright 1973 Van Nostrandt. In particular see pages 175 through 242.

These sheet molding compounds are well-known in the art and will not be described in detail here. Preferably the same sheet molding resin without the chopped glass fibers is used to impregnate the continuous filament fiberglass cylinder as is used to reinforce the stud openings.

While the preferred embodiment has been directed to a grill panel opening, the stud support of the present invention is equally applicable to any fiberglass part containing stud supports.

We claim:

1. In a glass fiber filled plastic vehicle body part, made from sheet molding compound containing from 22% to 35% of glass fibers having a length of from 12 to 50 millimeters, having a plurality of stud supports, the improvement characterized by each of the plurality of stud supports containing:

one non-woven continuous filament glass fiber cylinder embedded in each of the stud supports and completely surrounded by the sheet molding compound whereby each of the stud supports is reinforced to withstand the stress of the insertion of a self-threading stud.

* * * * *